United States Patent
Custro et al.

(10) Patent No.: US 6,867,258 B2
(45) Date of Patent: Mar. 15, 2005

(54) HIGH TRANSPARENCY POLYMERIC COMPOSITION

(75) Inventors: Sergio Custro, Ravenna (IT); Claudio Cavallo, Forli' (IT); Cristina Gobbi, Milan (IT)

(73) Assignee: Enichem S.p.A., San Donato Milanese (IT)

(*) Notice: Subject to any disclaimer, the term of this patent is extended or adjusted under 35 U.S.C. 154(b) by 54 days.

(21) Appl. No.: 10/251,854

(22) Filed: Sep. 23, 2002

(65) Prior Publication Data

US 2003/0065093 A1 Apr. 3, 2003

Related U.S. Application Data

(63) Continuation of application No. 09/466,794, filed on Dec. 20, 1999, now abandoned.

(30) Foreign Application Priority Data

Dec. 22, 1998 (IT) .......................................... MI98A2769

(51) Int. Cl.⁷ .............................................. C08L 53/02
(52) U.S. Cl. .......................................... 525/88; 525/98
(58) Field of Search ..................... 525/89, 98

(56) References Cited

U.S. PATENT DOCUMENTS

| | | |
|---|---|---|
| 5,036,130 A | 7/1991 | Walter et al. |
| 5,596,041 A | 1/1997 | Hashiguchi et al. |
| 5,627,234 A | 5/1997 | Giordano et al. |
| 6,235,841 B1 * | 5/2001 | Cavallo et al. ................ 525/89 |

FOREIGN PATENT DOCUMENTS

| | | |
|---|---|---|
| DE | 30 49 186 | 7/1982 |
| GB | 2232677 | 12/1990 |
| JP | 54-62251 | 5/1979 |
| WO | WO 99/46330 | 9/1999 |

OTHER PUBLICATIONS

Derwent Abstract, AN 1979–48000B, JP 54 062251, May 19, 1979.
Derwent Abstract, AN 1997–221051, JP 09 066554, Mar. 11, 1997.

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

High transparency polymeric composition essentially consisting of:

(1) from 30 to 95% of polystyrene;
(2) from 70% to 5% of a composition of vinylarene-conjugated diene block copolymers;
   the percentage sum of (1) and (2) being equal to 100; the composition (2) consisting of:
   (2a) from 30 to 60% by weight of copolymers with a linear structure
   (2b) from 70% to 40% by weight of copolymers with a branched structure;
the weight average molecular weight of the above composition (2) ranging from 30,000 to 400,000, preferably from 50,000 to 200,000.

19 Claims, No Drawings

HIGH TRANSPARENCY POLYMERIC COMPOSITION

This application is a Continuation of application Ser. No. 09/466,794 Filed on Dec. 20, 1999 now abandoned.

The present invention relates to high transparency polymeric compositions, more specifically compositions consisting of polystyrene crystal and vinylarene-conjugated diene block copolymers, preferably styrene-butadiene.

The mixing of general purpose polystyrene (crystal) with styrene-butadiene block copolymers, to increase the impact and tear strength with a low cost increase with respect to polystyrene as such, is known.

However not all block copolymers can be used for this purpose as the addition of even low percentages of copolymers often causes a drastic deterioration in the transparency of the polystyrene articles.

To maintain good transparency properties, it is necessary to add to the polystyrene crystal, styrene-butadiene copolymers having a very high polystyrene content (>60%), particular rheological characteristics (length of the styrene blocks and macro-structure of the polymer) and a high chemical purity (absence of additives which interfere with the light transmission).

In particular, when mixing the polystyrene crystal with a styrene-butadiene block copolymer, it is necessary to reach an optimum compromise between a uniform dispersion of the rubber particles inside the styrene matrix (adequate for the light transmission) and the necessity for these particles to have a sufficient dimension to act as shock-resistance agents of the polystyrene crystal.

The possibility is also known in the art (see for example U.S. Pat. No. 4,267,284), of obtaining transparent high impact polystyrene by the mixing of polystyrene crystal with linear styrene-diene copolymers in which the elastomeric phase consists of a random styrene-butadiene copolymer. This has advantages with respect to the use of completely block styrene-butadiene copolymers both as far as the optical properties are concerned (by the reduction in the refraction index difference between the polystyrene and elastomeric phase) and also with respect to the resilience characteristics (by the increase in volume of the shock-resistance rubbery phase). The dispersion of the rubber in the continuous plastomeric phase, in well-separated particles with uniform dimensions, proves to be less effective.

Another possibility known in the art is the use of partially block styrene-diene linear copolymers, characterized by a structure of the p(Sty)-SBR-p(Bde) type such as Europrene SOL S 142 (trade-name filed by ENICHEM S.p.A.) also used in compounding for shoes. However mixtures of polystyrene crystal with linear copolymers of the SOL S 142 type do not have an optimum balance of properties.

A composition of polystyrene and vinylarene-conjugated diene copolymers has now been found, which overcomes the advantages described above, as it has a high transparency together with almost unaltered mechanical properties.

In accordance with this, the present invention relates to a high transparency composition essentially consisting of:

(1) from 30% to 95%, preferably from 50% to 90%, of polystyrene;
(2) from 70% to 5%, preferably from 50% to 10%, of a composition of vinylarene-conjugated diene, preferably styrene—$C_4$ or $C_5$ conjugated diene, even more preferably styrene-butadiene, block copolymers;
   the percentage sum of (1) and (2) being equal to 100;
   composition (2) essentially consisting of:
   (2a) from 30% to 60% by weight, preferably from 35% to 50%, of copolymers with a linear structure;
   (2b) from 70% to 40% by weight, preferably from 65% to 50%, of copolymers with a branched structure;
   the weight average molecular weight of the above composition (2) ranging from 30,000 to 400,000, preferably from 50,000 to 200,000.

The weight content of vinylarene in the polymeric composition (2) of the present invention ranges from 50% to 70%, preferably from 60% to 80%, with a weight percentage of block vinylarene ranging from 40% to 90% of the total vinylarene, preferably from 50% to 70%.

The term vinylarenes refers to monovinyl substituted aromatic compounds having from 8 to 18 carbon atoms. Typical examples are styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)-styrene, 1-vinylnaphthalene, 2-vinylnaphthalene and relative mixtures. Styrene is the preferred vinylarene.

Examples of conjugated dienes which can be used in the present invention are 1,3-butadiene, isoprene, 2,3-dimethyl-1,3-butadiene, piperylene, 3-butyl-1,3-octadiene, and relative mixtures. Preferred are conjugated dienes having from 4 to 5 carbon atoms, i.e. isoprene and 1,3-butadiene, even more preferably 1,3-butadiene.

The polystyrene which can be used in the present invention is selected from commercially available, resinous, "general purpose" polystyrenes, which usually consist of polymerized styrene. The homopolymer of styrene, generally known as polystyrene "crystal", is preferable.

The term "linear structures" refers to structures of the type B-T-A wherein A, B and T will be defined further on.

The term "branched structures" refers to structures selected from those having general formula (I)

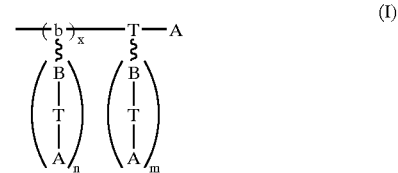

wherein:

1) A is the polyvinylarene block;
2) b is the monomeric unit of conjugated diene;
3) T is the statistic copolymer consisting of vinylarene and conjugated diene;
4) x is the number of monomeric units which form the polydiene block B;
5) B is the polydiene block;
6) n and m are the number of branches of the copolymer, n+m being from 1 to 5;
7) B-T-A is the partially block copolymer grafted on the polydiene function -(-b-)$_x$- or on the diene units of the statistic copolymer T.

The composition of vinylarene-conjugated copolymers (2), used in the preparation of the high transparency compositions of the present invention, is obtained according to the process described in the patent application of the same applicant IT-A-MI98A 001960. More specifically, composition (2) is prepared by reacting the vinylarene, preferably styrene, and the conjugated diene, preferably butadiene, with an organo-derivative of Lithium in an inert solvent, with the formation of a living polymer having an A-T-B-Li structure. Once all the monomers have reacted, an alkyl monobromo-derivative R-Br, preferably monobromoethane, is added to the solution, thus obtaining the polymeric composition (2). The monobromo-derivative R-Br, as well as acting as branching agent, also behaves as a quenching agent and an additional quenching step with reagents such as water and alcohols, is therefore not necessary.

The high transparency compositions of the present invention can preferably contain other additives, for example antioxidants.

The following examples are provided for a better understanding of the present invention. In the following examples the term "partially branched copolymers" refers to the composition of copolymers (2).

EXAMPLE 1

Comparative Example 1A

Synthesis of the Comparative Linear Copolymer 600 grams of cyclohexane containing 80 ppm of tetrahydrofuran (THF), 70 grams of styrene and 30 grams of butadiene are charged into a two liter stainless steel reactor equipped with a thermostatic jacket and all the connections necessary for introducing the reagents.

The mixture is heated to a temperature of 55° C. and 12.5 ml of a solution of Lithium n-butyl in cyclohexane (0.1 N) are added. After 30 minutes the conversion of the monomers is complete and the final temperature is 90° C. In this way a solution of a three-block living copolymer is obtained, having a p(Bde)-SBR-p(Sty) structure, to which 0.5 ml of methanol are added; 0.1 grams of tri-nonyl-phenyl-phosphite (Naugard® TNPP) and 0.05 grams of 2,4-bis-(n-octyl-thio)-6-(4-hydroxy-3,5-di-ter-butyl-aniline)-1,3,5,-triazine (Irganox® 565) are then added as antioxidants.

The product is recovered from the polymeric solution by the addition of 4000 grams of methanol. In this way a product is obtained, having a linear structure and characterized by the properties indicated in table 1.

EXAMPLE 1b

Synthesis of the Partially Branched Copolymer (1B)

600 grams of cyclohexane containing 80 ppm of THF, 70 grams of styrene and 30 grams of butadiene are charged into a two liter stainless steel reactor equipped with a thermostatic jacket and all the connections necessary for introducing the reagents.

The mixture is heated to a temperature of 55° C. and 14.5 ml of a solution of Lithium n-butyl in cyclohexane (0.1 N) are added. After 30 minutes the conversion of the monomers is complete and the final temperature is 90° C.

In this way a solution of a three-block living copolymer is obtained, having a p(Bde)-SBR-p(Sty) structure, to which 2.6 ml of a solution of monobromoethane (0.5 N) in cyclohexane are added; after 30 minutes at 90° C., the reaction is complete and 0.1 grams of tri-nonyl-phenyl-phosphite (Naugard® TNPP) and 0.05 grams of 2,4-bis-(n-octyl-thio)-6-(4-hydroxy-3,5-di-ter-butyl-aniline)-1,3,5-triazine (Irganox® 565) are then added as antioxidants.

The product is recovered from the polymeric solution by the addition of 4000 grams of methanol. In this way a product is obtained, having a partially branched structure, i.e. a 50% linear structure and 50% branched structure. The properties are indicated in table 1.

EXAMPLE 1c

Mixtures of Polystyrene Crystal—Copolymers

Two series of products are prepared by mixing linear (comparative example 1a) and partially branched (example 1b) copolymers, respectively, with a commercial "general purpose" (crystal) polystyrene Edistir N 1840 (Enichem, MFI=9), in composition ratios polystyrene/copolymer of 50/50 and 90/10 (weight/weight), tests 1,2 and 3,4 in table 2).

For the preparation of the mixtures, a co-rotating APV MP 2030 twin-screw extruder was used under the following mixing conditions: feeding 10 (kg/h), temperature profile T=170–220° C. and screw rate V=100 rpm. The products, extruded into wires, were cooled in water, cut into pellets and subsequently dried in an air oven at T=50° C. for 4 hours before being molded.

The injection molding was carried out using a Sandretto Serie Otto press, under temperature conditions T=190–210° C. and a mold temperature T=25° C.

The optical characteristics of the mixtures were determined according to the method ASTM D1003, using test samples having a thickness of 2.0 mm. The tensile properties were determined according to the method ASTM D 638. The shock-resistance properties were determined according to the method ASTM D 256, on test samples without notch, at room temperature.

The fluidity index of the products as such and of the mixtures was determined according to the method ASTM D1238, under conditions G (200° C.; 5 Kg).

The results are indicated in table 2.

EXAMPLE 2

Example 2a

Synthesis of Comparative Linear Copolymer 2A 600 grams of cyclohexane containing 100 ppm of tetrahydrofuran (THF), 70 grams of styrene and 30 grams of butadiene are charged into a two liter stainless steel reactor equipped with a thermostatic jacket and all the connections necessary for introducing the reagents.

The mixture is heated to a temperature of 55° C. and 9 ml of a solution of Lithium n-butyl in cyclohexane (0.1 N) are added. After 30 minutes the conversion of the monomers is complete and the final temperature is 90° C. In this way a solution of a three-block living copolymer is obtained, having a p(Bde)-SBR-p(Sty) structure, to which 0.5 ml of methanol are added; 0.1 grams of tri-nonyl-phenyl-phosphite (Naugard® TNPP) and 0.05 grams of 2,4-bis-(n-octyl-thio)-6-(4-hydroxy-3,5-di-ter-butyl-aniline)-1,3,5-triazine (Irganox® 565) are then added as antioxidants.

The product is recovered from the polymeric solution by the addition of 4000 grams of methanol. In this way a product is obtained, having a linear structure and characterized by the properties indicated in table 1.

EXAMPLE 2b

Synthesis of the Partially Branched Copolymer 2B 600 grams of cyclohexane containing 100 ppm of THF, 70 grams of styrene and 30 grams of butadiene are charged into a two liter stainless steel reactor equipped with a thermostatic jacket and all the connections necessary for introducing the reagents.

The mixture is heated to a temperature of 55° C. and 10 ml of a solution of Lithium n-butyl in cyclohexane (0.1 N) are added. After 30 minutes the conversion of the monomers is complete and the final temperature is 90° C.

In this way a solution of a three-block living copolymer is obtained, having a p(Bde)-SBR-p(Sty) structure, to which 1.8 ml of a solution of monobromoethane (0.5 N) in cyclohexane are added; after 30 minutes at 90° C., the reaction is complete and 0.1 grams of tri-nonyl-phenyl-phosphite (Naugard® TNPP) and 0.05 grams of 2,4-bis-(n-octyl-thio)-6-(4-hydroxy-3,5-di-ter-butyl-aniline)-1,3,5-triazine (Irganox® 565) are then added as antioxidants.

The product is recovered from the polymeric solution by the addition of 4000 grams of methanol. In this way a product is obtained, having a partially branched structure (49% linear and 51% branched) and characterized by the properties indicated in table 1.

EXAMPLE 2c

Mixtures of Polystyrene Crystal—Copolymers

Two series of products (5,6 and 7,8) were prepared by mixing linear (comparative example 2a) and branched (example 2b) copolymers, respectively, with a commercial "general purpose" (crystal) polystyrene Edistir N 1840 (Enichem, MFI=9), in composition ratios polystyerene/copolymer of 50/50 and 90/10 (weight/weight).

For the preparation of the mixture, a co-rotating APV MP 2030 twin-screw extruder was used under the following mixing conditions: feeding 10 (kg/h), temperature profile T=170–220° C. and screw rate V=100 rpm. The products, extruded into wires, were cooled in water, cut into pellets and subsequently dried in an air oven at T=50° C. for 4 hours before being molded.

The injection molding was carried out using a Sandretto Serie Otto press, under temperature conditions T=190–210° C. and a mold temperature T=25° C.

The optical characteristics of the mixtures were determined according to the method ASTM D1003, using test samples having a thickness of 2.0 mm. The tensile properties were determined according to the method ASTM D 638. The shock-resistance properties were determined according to the method ASTM D 256, on test samples without notch, at room temperature.

The fluidity index of the products as such and of the mixtures was determined according to the method ASTM D1238, under conditions G (200° C.; 5 Kg).

The results are indicated in table 2.

EXAMPLE 3

Example 3a

Synthesis of Comparative Linear Copolymer 3A 600 grams of cyclohexane containing 80 ppm of tetrahydrofuran (THF), 70 grams of styrene and 30 grams of butadiene are charged into a two liter stainless steel reactor equipped with a thermostatic jacket and all the connections necessary for introducing the reagents.

The mixture is heated to a temperature of 55° C. and 12.5 ml of a solution of Lithium n-butyl in cyclohexane (0.1 N) are added. After 30 minutes the conversion of the monomers is complete and the final temperature is 90° C. In this way a solution of a three-block living copolymer is obtained, having a p(Bde)-SBR-p(Sty) structure, to which 0.5 ml of methanol are added; 0.1 grams of tri-nonyl-phenyl-phosphite (Naugard® TNPP) and 0.05 grams of 2,4-bis-(n-octyl-thio)-6-(4-hydroxy-3,5-di-ter-butyl-aniline)-1,3,5-triazine (Irganox® 565) are then added as antioxidants.

The product is recovered from the polymeric solution by the addition of 4000 grams of methanol. In this way a product is obtained, having a linear structure and characterized by the properties indicated in table 1.

EXAMPLE 3b

Synthesis of the Partially Branched Copolymer 3B 600 grams of cyclohexane containing 80 ppm of THF, 80 grams of styrene and 30 grams of butadiene are charged into a two liter stainless steel reactor equipped with a thermostatic jacket and all the connections necessary for introducing the reagents.

The mixture is heated to a temperature of 55° C. and 11 ml of a solution of Lithium n-butyl in cyclohexane (0.1 N) are added. After 30 minutes the conversion of the monomers is complete and the final temperature is 90° C.

In this way a solution of a three-block living copolymer is obtained, having a p(Bde)-SBR-p(Sty) structure, to which 2.0 ml of a solution of monobromoethane (0.5 N) in cyclohexane are added; after 30 minutes at 90° C., the reaction is complete and 0.1 grams of tri-nonyl-phenyl-phosphite (Naugard® TNPP) and 0.05 grams of 2,4-bis-(n-octyl-thio)-6-(4-hydroxy-3,5-di-ter-butyl-aniline)-1,3,5-triazine (Irganox® 565) are then added as antioxidants.

The product is recovered from the polymeric solution by the addition of 4000 grams of methanol. In this way a product is obtained, having a partially branched structure (50% linear and 50% branched) and characterized by the properties indicated in table 1.

EXAMPLE 3c

Mixtures of Polystyrene Crystal—Copolymers

Two series of products (tests 9,10 and 11,12 of table 2) were prepared by mixing linear (comparative example 3a) and partially branched (example 3b) copolymers, respectively, with a commercial "general purpose" (crystal) polystyrene Edistir N 1840 (Enichem, MFI=9), in composition ratios polystyrene/copolymer of 50/50 and 90/10 (weight/weight).

For the preparation of the mixture, a co-rotating APV MP 2030 twin-screw extruder was used under the following mixing conditions: feeding 10 (kg/h), temperature profile T=170–220° C. and screw rate V=100 rpm. The products, extruded into wires, were cooled in water, cut into pellets and subsequently dried in an air oven at T=50° C. for 4 hours before being molded.

The injection molding was carried out using a Sandretto Serie Otto press, under temperature conditions T=190–210° C. and a mold temperature T=25° C.

The optical characteristics of the mixtures were determined according to the method ASTM D1003, using test samples having a thickness of 2.0 mm. The tensile properties were determined according to the method ASTM D 638. The shock-resistance properties were determined according to the method ASTM D 256, on test samples without notch, at room temperature.

The fluidity index of the products as such and of the mixtures was determined according to the method ASTM D 1238, under conditions G (200° C.; 5 Kg).

The results are indicated in table 2.

TABLE 1

CHARACTERISTICS OF THE POLYMERS

| Copolymer | % Styrene | % block styrene | $M_w$ (×10$^{-3}$) | MFI (g/10 min.) |
|---|---|---|---|---|
| 1A (ex.1a) | 70 | 55 | 98 | 25 |
| 1B (ex. 1b) | 70 | 55 | 137 | 25 |
| 2A (ex. 2a) | 70 | 50 | 124 | 7 |
| 2B (ex. 2b) | 70 | 50 | 195 | 7 |
| 3A (ex. 3a) | 80 | 58 | 115 | 10 |
| 3B (ex. 3b) | 80 | 58 | 175 | 10.5 |

TABLE 2

CHARACTERISTICS OF THE MIXTURES

| Test | Cop. | PS/Cop | Impact | B.L. | U.E. | Trans. | Haze |
|---|---|---|---|---|---|---|---|
| Edistir N1840 | | | 80 | 45 | 1 | 90.3 | 0.9 |
| 1 | 1A | 50/50 | 200 | 35 | 15 | 75 | 23 |
| 2 | 1B | 50/50 | 170 | 25 | 8 | 80 | 18 |
| 3 | 1A | 90/10 | 120 | 43 | 6 | 84 | 8 |
| 4 | 1B | 90/10 | 110 | 38 | 3 | 89 | 3.5 |
| 5 | 2A | 50/50 | 210 | 35 | 18 | 80 | 16 |
| 6 | 2B | 50/50 | 175 | 30 | 15 | 83 | 10.5 |
| 7 | 2A | 90/10 | 130 | 40 | 5 | 86 | 2.7 |
| 8 | 2B | 90/10 | 115 | 37.5 | 4 | 89 | 2 |
| 9 | 3A | 50/50 | 160 | 40 | 10 | 82 | 8 |
| 10 | 3B | 50/50 | 150 | 35 | 8 | 87 | 5 |
| 11 | 3A | 90/10 | 100 | 42 | 6 | 87.5 | 3 |
| 12 | 3B | 90/10 | 90 | 37 | 5 | 89 | 2 |

In table 2 above, column 1 represents the type of copolymer used (those linear, abbreviated as "A", are all comparative), column 2 the weight percent of polystyrene and block copolymers, column 3 indicates the Izod impact measurement expressed in J/m, the fourth column (B.L.) is the breaking load measurement in Mpa, the fifth column (U.E.) represents the ultimate elongation and is expressed in %, the sixth column (Trans.) represents the transmittance value %, the seventh column (Haze) represents the Haze value %.

As can be seen from tests 1 and 3, the comparative linear copolymer (1A) does not allow a satisfactory balance of properties to be obtained. In fact, whereas the impact characteristics and tensile properties are satisfactory and greatly improved with respect to those typical of polystyrene crystal, the optical properties remain insufficient for the end application.

Also in tests 5 and 7, where the comparative copolymer (2A) is used, which has a greater molecular mass and consequently a very reduced fluidity, the mixtures have additionally improved impact characteristics, but optical properties which are still not optimum.

With the products of the present invention 1B (tests 2 and 4) and 2B (tests 6 and 8), on the contrary, it can be observed that, whereas the impact properties are still very high and the tensile properties sufficiently good, the optical properties are greatly improved with respect to those described above.

Finally the same behaviour is also observed in the case of products with a greater styrene content (comparative 3A, tests 9 and 11; 3B, tests 10 and 12) for which, although the characteristics of the mixtures are entirely comparable, there is a considerable advantage in the optical properties for the product with a partially branched structure of the present invention (3B).

What is claimed is:

1. A high transparency composition consisting essentially of
    (1) from 30% to 95% of polystyrene homopolymer;
    (2) from 70% to 5% of a composition of one or more vinylarene-conjugated diene block copolymers;
    the percentage sum of (1) and (2) being equal to 100;
    wherein composition (2) consists essentially of
        (2a) from 30% to 60% by weight of one or more copolymers with a linear structure;
        (2b) from 70% to 40% by weight of one or more copolymers with a branched structure; wherein
            (i) the copolymers with a linear structure (2a) have structure of the type B-T-A;
            (ii) the copolymers with a branched structure (2b) have formula (I):

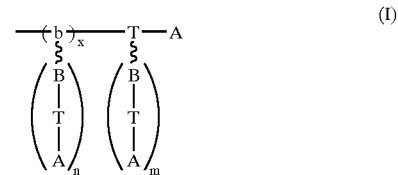

(I)

wherein:
1) A is a polyvinylarene block;
2) b is a monomeric unit of conjugated diene;
3) T is a vinylarene conjugated diene random copolymer;
4) x is the number of monomer units which form a polydiene block B;
5) B is the polydiene block;
6) n and m are the number of branches of the copolymer, n+m is from 1 to 5;
7) B-T-A is the partially block copolymer grafted on the polydiene function -(-b-)$_x$- or on the diene units of the random copolymer T,
the weight average molecular weight of the above composition (2) is from 30,000 to 400,000, and
the conjugated diene blocks are unsaturated,
wherein a 2.0 mm thick sample of the high transparency composition has a transparency of 80–89%.

2. The composition according to claim 1, consisting essentially of 50% to 90% of the polystyrene (1), and from 50% to 10% of (2).

3. The composition according to claim 1, wherein (2) consists essentially of
    (2a) from 35% to 50% of one or more copolymers with a linear structure;
    (2b) from 65% to 50% of one or more copolymers with a branched structure.

4. The composition according to claim 1, wherein the vinylarene is styrene and the conjugated diene has 4 or 5 carbon atoms.

5. The composition according to claim 4, wherein the conjugated diene is butadiene.

6. The composition according to claim 1, wherein the weight content of vinylarene in (2) is from 50% to 70%.

7. The composition according to claim 6, wherein the weight content of vinylarene in (2) is from 60% to 80%.

8. The composition claim 1, wherein the weight average molecular weight of (2) is from 50,000 to 200,000.

9. The composition of claim 1, consisting of
    (1) from 30% to 95% of one or more polystyrene homopolymers;

(2) from 70% to 5% of a copolymer composition consisting of from 30% to 60% by weight of one or more partially block copolymers with a linear structure and from 70% to 40% by weight of one or more partially block copolymers with a branched structure.

10. The composition of claim 1, wherein the composition has a transparency of from 83 to 89%.

11. The composition of claim 1, wherein the conjugated diene is 1,3-butadiene.

12. A composition consisting essentially of:
   (1) from 30% to 95% of polystyrene homopolymer,
   (2) from 70% to 5% of a copolymer composition consisting essentially of from 30% to 60% by weight of one or more partially block copolymer with a linear structure and from 70% to 40% by weight of one or more partially block copolymers with a branched structure, wherein the partially block copolymer with a linear structure and the branches of the partially block copolymer with a branched structure are of formula A-T-B;

wherein A is a block of polymerized units of a vinylarene, T is a random block of polymerized units of a vinylarene and a conjugated diene, and B is an unsaturated block of polymerized units of a conjugated diene, wherein the copolymer with a branched structure consists essentially of units of the partially block copolymer A-T-B grafted onto the conjugated diene block or random block of the partially block copolymer, wherein the weight average molecular weight of the copolymer composition is from 30,000 to 400,000, wherein the percentage sum of (1) and (2) is equal to 100, and wherein a 2.0 mm thick sample of the composition has a transparency of from 80 to 89%.

13. The composition of claim 12, wherein the polystyrene homopolymer is present in an amount of from 50 to 90%.

14. The composition of claim 12, wherein the copolymer composition is present in an amount of from 50 to 10%.

15. The composition of claim 12, wherein the copolymer composition consists essentially of from 35 to 50% of the partially block copolymer with a linear structure and from 65 to 50% of the partially block copolymer with a branched structure.

16. The composition of claim 12, wherein the weight average molecular weight of the copolymer composition is from 50,000 to 200,000.

17. The composition of claim 12, wherein the vinylarene is styrene and the conjugated diene contains 4 or 5 carbon atoms.

18. The composition of claim 12, wherein the composition has a transparency of from 83 to 89%.

19. The composition as claimed in claim 12, wherein the composition has a transparency of from 87 to 89%.

* * * * *